(No Model.) 4 Sheets—Sheet 1.
L. HAGEN.
DRIER.
No. 330,018. Patented Nov. 10, 1885.
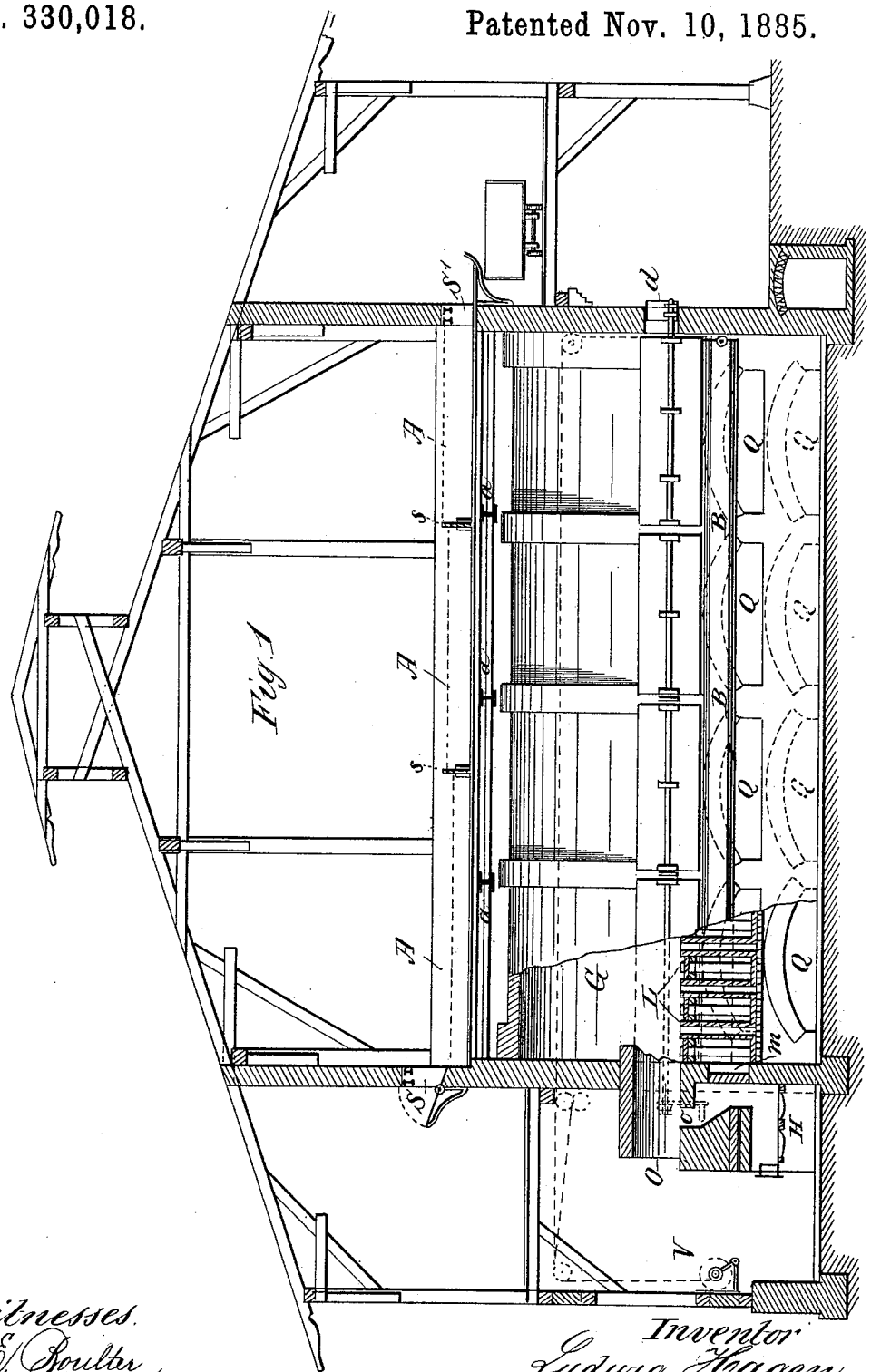

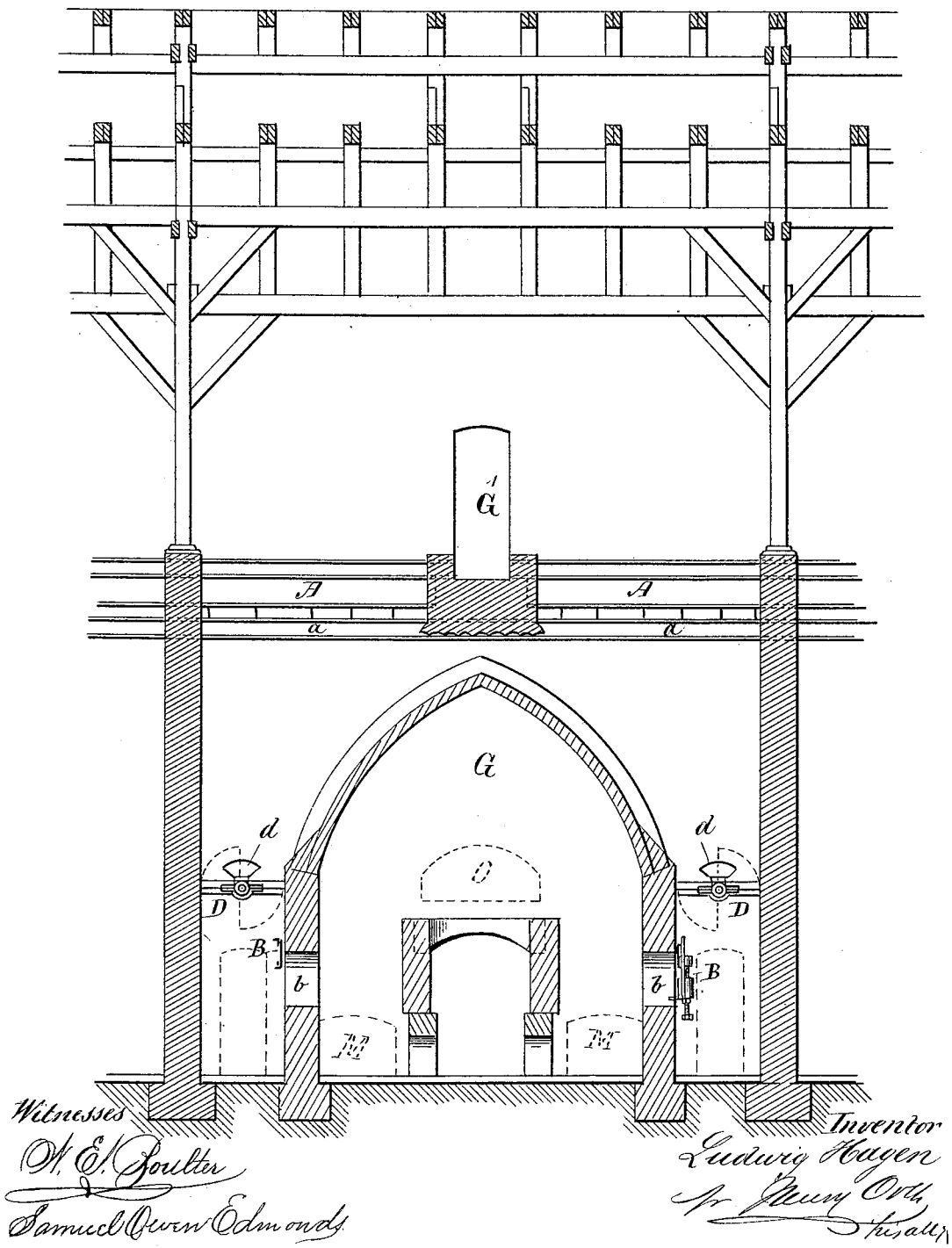

(No Model.) 4 Sheets—Sheet 3.
L. HAGEN.
DRIER.
No. 330,018. Patented Nov. 10, 1885.
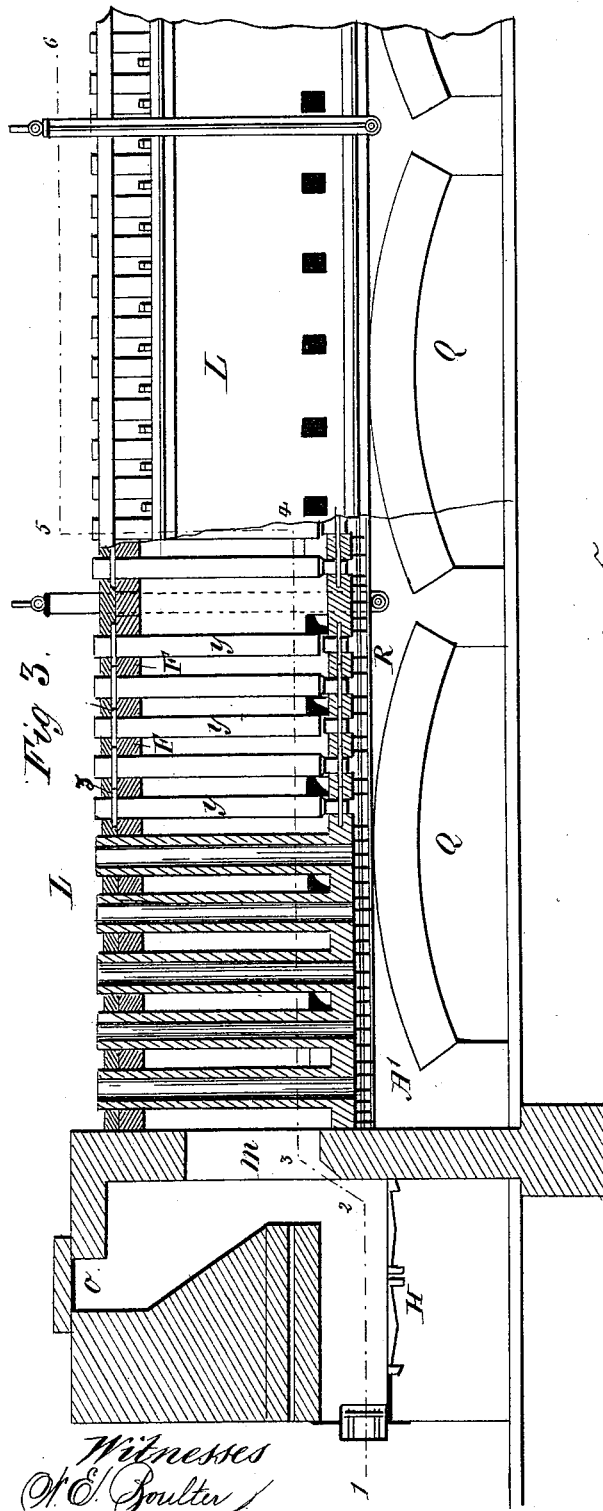
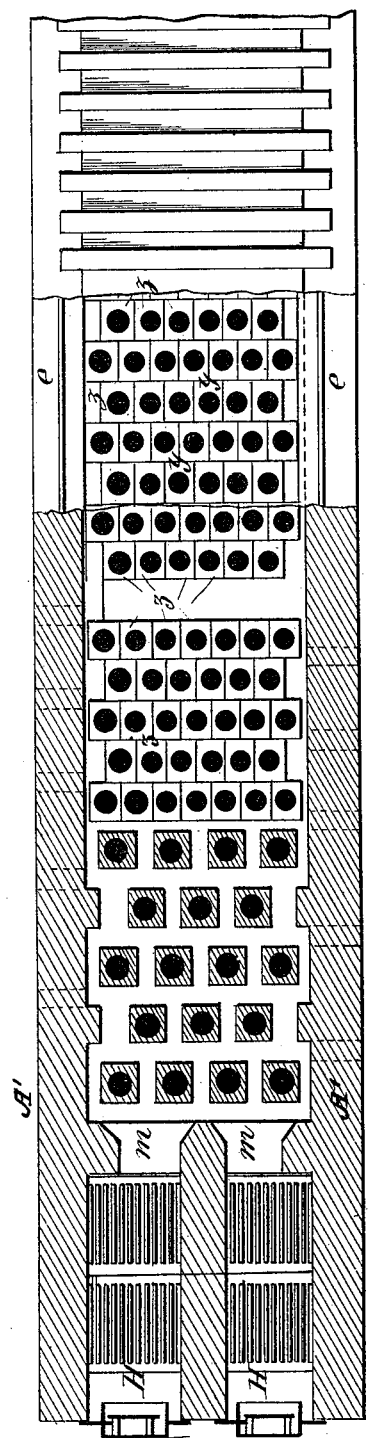
Witnesses
W. E. Boulter
Samuel Edmonds
Inventor
Ludwig Hagen (No Model.) 4 Sheets—Sheet 4.
L. HAGEN.
DRIER.
No. 330,018. Patented Nov. 10, 1885.
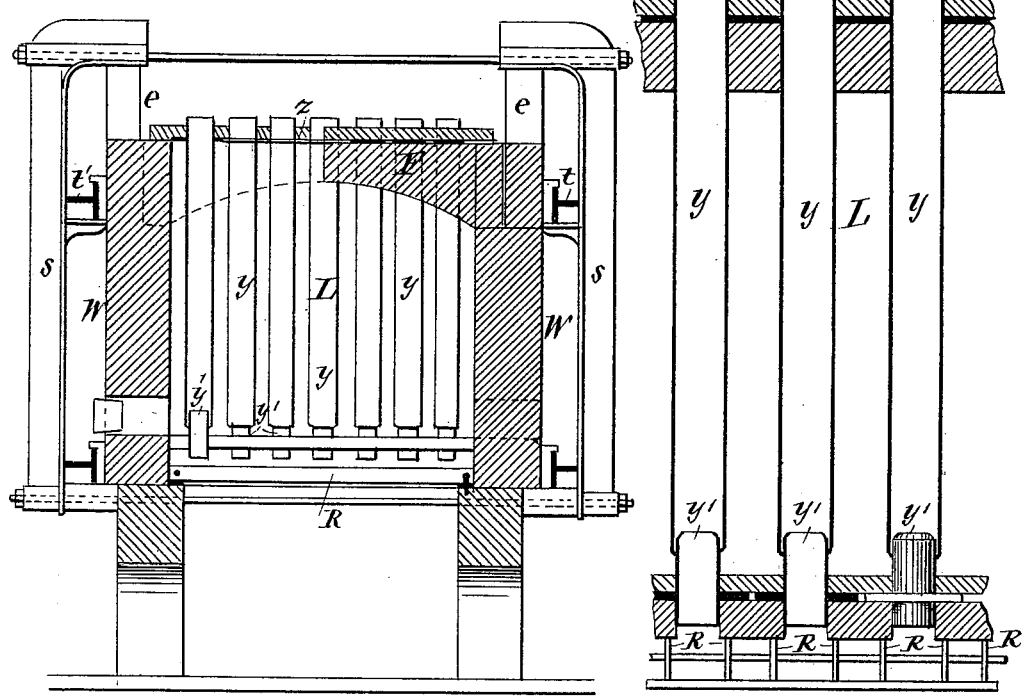

UNITED STATES PATENT OFFICE.

LUDWIG HAGEN, OF MAGDEBURG, PRUSSIA, GERMANY.

DRIER.

SPECIFICATION forming part of Letters Patent No. 330,018, dated November 10, 1885.

Application filed June 20, 1884. Serial No. 135,533. (No model.)

*To all whom it may concern:*

Be it known that I, LUDWIG HAGEN, civil engineer, subject of the King of Prussia, residing at 2 Frankenstrasse, Magdeburg, Prussia, German Empire, have invented certain new and useful Improvements in Driers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in driers; and it consists, primarily, in combining in one and the same drying-house or apparatus means whereby substances may be dried by the heat and products of combustion directly, or whereby such substances may be smoked, and means whereby substances may be dried by means of hot air.

The invention further consists in the construction and arrangement of parts whereby the above results may be obtained.

The object of this invention is to provide means, especially adapted for husbandry, whereby all descriptions of produce capable of being preserved by desiccation or by other means of preserving and smoking, as in the case of meat, may be treated.

Heretofore drying-houses or apparatuses have been constructed either for drying or smoking substances by direct contact with the heat and the products of combustion or the imperfect products of combustion, or for drying substances by means of air heated in separate chambers or ducts, or passing over heated surfaces to avoid the contact of the substances treated with the products of combustion, and separate driers or smoke-houses are therefore required for treating all the various products of the farm and other products, which is avoided by my invention.

My improved drier is also adapted for drying crops which when cut down are exposed to protracted rains, whereby said crops would be ruined or partially ruined unless speedily dried, as for instance, grain, which when cut down and then exposed to protracted moisture is liable to germinate, or hay or other food for stock, which is liable to become musty. It is also designed for drying food for stock derived from other branches of the arts—as from the manufacture of sugar from beet-roots— and for drying other substances capable of being desiccated for preservation and used as food for stock; in fact for desiccating all substances or articles designed for use as food for man or beast.

In the accompanying drawings, Figure 1 shows my improved drier by a longitudinal vertical section. Fig. 2 is a like transverse section thereof. Fig. 3 is a vertical transverse section of the heating devices for supplying hot air to the drier. Fig. 4 is a transverse section of the same; Fig. 5, a horizontal section taken on the irregular line 1, 2, 3, 4, 5, and 6 of Fig. 3; and Fig. 6 is a detail view.

Like letters indicate like parts wherever such may occur in the above figures of drawings.

The drier is composed of a drying-floor divided into any desired number of spaces, or of a series of drying-floors, A A, arranged side by side under the same roof, and in communication with a chimney or other means of escape for the vapors, heat, and products of combustion. The drying-floors A A are supported on suitable metallic beams, $a$, and separated one from another by partitions $s\ s$, as shown. I prefer to make these partitions of different height, so that their capacity may be increased thereby in proportion to their distance from the source of heat. The drying floor or space is also divided longitudinally by a gangway, G', of masonry supported on corrugated sheet metal, whereby access is had to the several drying-compartments.

In the drawings I have shown the drying-space divided into six floors, three on each side of the central gangway. It will be readily understood that this arrangement may be varied at will and the floor divided into any desired number of sections longitudinally and transversely, each longitudinal row of sections being provided with means for introducing and removing the material treated. The furnace H is in communication, by means of an opening, $o$, in its roof, with a segmental arch-chamber, G, and by means of openings $m$ with the air-heating apparatus L. The latter is composed of a chamber extending from end to end of the chamber G and containing a series of heating-flues. When the drying is to be carried on by direct contact of the products of combustion with the material to be dried, the openings m are closed, as in Fig. 1, and the heat and products of combustion pass from the furnace through opening o into a cold-air duct, O, where they are mixed with atmospheric air, and thence pass into the chamber G, wherein by current and counter-current an equalization as well as a reduction to the proper degree of the temperature of the gases takes place. The heated air and gases escape from chamber G at a practically uniform temperature through openings b and the lower edges of the valves or dampers B to the desiccating-floors.

Although the cold air is admitted at O and the hot air and products of combustion from the grate or furnace H are brought in immediate contact as the latter escape at o, it will be understood that the chamber or space G should be sufficiently large to equalize and reduce the temperature of said air and gases, so that when they issue from the valved passages b they will have the temperature required for the desiccation of the material on the drying-floors.

The two valves or dampers B are constructed of sheet metal, and pivoted at one end to a stud, while at the opposite end adjusting devices V are connected therewith for raising and lowering said dampers.

Certain products—such as fruit, potatoes, &c.—should preferably be dried gradually, otherwise a hard crust or skin is formed thereon, which renders the complete desiccation very difficult, while near the completion of the desiccation said material can withstand higher temperature as well as increased circulation of the air. If it is desired to dry such materials, the dampers B are lowered at the left, or at that point where the fresh material is introduced at S onto the first drying-sections A, so that less heated and rapid currents of air will ascend to the said drying-sections at that point, the material being shifted from floor to floor toward the right of the series as the process of drying progresses, and when completed are discharged at S'. On opposite sides of the chamber G are arranged the throttle-valves D D, adapted to close by means of segmental valves the segmental passages d d. Said valves are made of sheet metal, and serve the purpose of closing the openings d d when the throttles stand in a vertical position, while when said throttles are in a horizontal position the segmental valves uncover the said passages d d. By means of these valves the drying-floor is cut off from the source of heat when the workmen are engaged on said floor, cold air being admitted from without through the openings or passages d d, formed in the walls of the structure, said openings being closed when the process of desiccation is resumed. If it is desired to dry by means of hot air, the openings o o, above the furnace or grate H, are closed, while the openings m m, as well as the air-inlets M M, on opposite sides of the furnace, are opened. Fresh air ascends through a series of heating-pipes in the heater L, Figs. 3 and 4, and escapes therefrom in a heated condition into the chamber G, wherein again the described equalization of the temperature takes place, and thence the heated air passes through the openings b to the drying-floors.

To facilitate the construction of the heater, as well as the repairing thereof, I preferably construct the same as shown in Figs. 3, 4, 5, and 6. The heater is formed of the end walls of the structure and of the lateral walls A' A', provided with openings Q Q, through which the outer air entering at M M passes to the heating-pipes. On these foundation-walls A A' are built the cheek-walls W W in such manner as to leave an offset for the support of a grate, R, formed of flat iron bars. The floor of the heater is constructed of masonry supported by the grate R, the bars of which are set on edge and connected by means of round rods in such manner that they cannot tilt.

In order to obtain a uniform heating of the air admitted to the heating-pipes, those nearest the source of heat are preferably made of increased thickness, and either of cast-iron or fire clay, chamotte, or other like material, and made to form, so to say, hollow pillars, whereby red-hot surfaces are provided when said pillars become properly heated, against which the gases and products of combustion impinge and the combustion thereof completed. At the same time the temperature of the heated gases and the products of combustion will be sufficiently cooled before reaching the next series of cast-iron pipes, so that the latter will not be destroyed thereby. The air passing through the pillars of refractory material, notwithstanding the fact that these pillars are subjected to the greatest heat, (owing to the nature of the material,) will not be heated much more than the air passing through the other series of heating-pipes, and to still more equalize the heating of the air those heating-pipes farthest removed from the source of heat are or may be made of sheet metal.

The metal tubes are constructed and arranged as shown in Fig. 6. $y'$ $y'$ are short pipes permanently built in the masonry of the floor, and $y$ $y$ are the air-tubes, of such diameter as to fit over the short sections $y'$. At the upper end of the pipes $y$ is a flange that is seated on the roof of the heater, so that said pipes can readily shift upon their connections $y'$ when contraction or expansion of the metal takes place under varying temperatures, and thereby avoiding the fissuring of the walls of the heater.

The manner of connecting the pipes $y$ with the heater has another advantage. There is generally a tendency of the hot air surrounding the heater to enter into it, and all leaks act injuriously upon the effect of the heat. It is therefore necessary to provide means to prevent this as much as possible and maintain the heater air-tight. The pipes $y$ and their connections $y'$ should, however, be loosely connected with each other, and there is a source of leakage at that point, especially since the pipe $y$ will expand more than the pipe $y'$, the latter being partially embedded in masonry and in constant contact with cold air, while the pipe $y$ is during the operation of the heater constantly exposed to high temperatures. The speed at which the air enters at $y'$ into $y$ is such as to act in a measure as an injector, and sucks in gases from the heater in comparatively small volumes, instead of allowing the cold air to be drawn into the heater at the joints to cool the gases and products of combustion and escape with them through the chimney. For the purposes described the admixture of a limited volume of these gases has no deleterious effect upon the substances treated. The setting of the heating-pipes is effected as follows: The chamber L is covered by arch brick or stones F, arranged at such distances apart as to permit the introduction of the pipes between them. The stones F are secured in position by anchors S and rails or braces $t$, and each pipe $y$ has a flange, $z$, which is seated upon the arch-stones, said flanges having such a form that when in position they will abut against each other, as shown in Fig. 4. In order to form tight joints around these pipes and between their flanges, I fill up the space with fire-proof mortar, which may be made of ordinary clay, which is retained in place by the angle-irons $e$, extending along the heater. If at the end of the drying season it is desired to remove the heating-pipes to preserve them against rust, this layer of mortar is removed, and the pipes may then be readily withdrawn. By means of this construction the removal and replacing of the pipes may be readily effected or new pipes inserted when worn, which any ordinary mason can do. If the drier is located in proximity to a source of heat—as, for instance, the furnace of a steam-boiler—the products of combustion and waste heat may be conducted into the drier and utilized for purposes of desiccation, in which case it will readily be understood that the walls of the heating-tubes will be made of a thickness corresponding to the heat derived from such furnace.

Other well-known and appropriate constructions of heaters may be employed instead of the heater described and the same results obtained.

Having now described my invention, what I claim, and desire to secure by Letters Patent, is—

1. In a kiln or drier, the combination, with the drying-chamber, its source of heat, and an air-heating apparatus, of the chamber G, surrounding said air-heating apparatus, suitable connections between said source of heat, the drying-chamber and air-heating apparatus, and cut-off devices operating to direct the heat from the source of heat to the drying-chamber or to the air-heater at will, substantially as described, for the purpose specified.

2. The combination, with the drying-chamber of a kiln or drier, and an air-heating apparatus, of the furnace H, and the valved passages $o$ $m$, connecting said furnace with said drying-chamber and air-heater, respectively, substantially as described, for the purpose specified.

3. The combination, with the drying-chamber of a kiln or drier and the source of heat-supply, of an equalizing-chamber, G, in communication with the drying-chamber by means of valved passages $b$, and with the source of heat-supply by means of a passage opening into a cold-air flue, substantially as and for the purpose specified.

4. The combination, with the drying-chamber of a kiln, an air-heating apparatus, a source of heat-supply, and valved connections between the latter and air-heater, of a chamber, G, inclosing the air-heater, and valved connections between the source of heat-supply, the chamber G, and the drying-chamber, whereby hot air from the heater or the heat and products of combustion may be admitted into the drying-chamber through said chamber G, substantially as and for the purpose specified.

5. The combination, with the chamber G, the drying-chamber of the kiln, provided with air-inlets $d$, and the source of heat-supply in communication with said chamber G, of the valves D $d'$, substantially as described, for the purpose specified.

6. The combination, with the drying-chamber of the kiln, provided with air-inlets $d$, the source of heat supply, and an air-heating apparatus, in communication with one another, and means for cutting off said communications, of the chamber G, in communication with the source of heat-supply, and provided with valved passages $b$ and the valves D $d'$, said parts being arranged for operation substantially as described, for the purpose specified.

7. The combination, in a kiln or drier, with the drying-chamber and the source of heat-supply, of a multitubular air-heater having its air flues or tubes arranged in series or sections, and the radiating power whereof increases with or in proportion to their distance to said source of heat, and valves operating independently to admit the hot air from any one or more of the series or sections of tubes directly to the drying-chamber, as described, for the purpose specified.

8. In a kiln or drier, the combination, with a series of drying-floors, a source of heat-supply, and a multitubular air-heater extending underneath said floors, the air flues or tubes of which heater are arranged in corresponding series of varying radiating power, which latter increases with or in proportion to the distance of said flues and floors from the source of heat, of an equalizing-chamber inclosing the heater, and valved passages for each series of tubes the valves whereof operate independently to regulate and direct the flow of heated air to the drying-floors, substantially as and for the purpose specified.

9. In a kiln or drier, the combination, with a series of drying-floors, a furnace, and a multitubular air-heater extending underneath said floors, and having its air flues or tubes arranged in series of varying radiating power, which latter increases with or in proportion to the distance of said tubes and their corresponding drying-floor from the furnace, of an equalizing chamber, G, inclosing the air-heater, and provided with a valved passage for each floor-section above, the valves whereof operate independently to open or close their respective passages, air-ports to admit air into the air heater and chamber G, and the valved passages M and O, whereby the heat and products of combustion are made to pass through the air heater or the chamber G, substantially as and for the purpose specified.

10. In a kiln or drier, the combination, with the drying-chamber, of a multitubular air-heater composed of a chamber having its roof formed of a series of arches or ribs, and air-tubes extending between the arches through the floor of the chamber, with their flanges $z$ resting on the arches and abutting against one another, whereby said tubes are held in proper position and relation to one another, substantially as described, for the purpose specified.

11. In a kiln or drier, a multitubular air-heater composed of a chamber having its roof formed of a series of arches or ribs, air-tubes $y$, extending between the same, with their flanges $z$ resting on the arches and abutting against one another, in combination with the short tubes $y'$, secured in the floor of the chamber, onto which the tubes $y$ are fitted, substantially as described, for the purpose specified.

In testimony whereof I affix my signature in presence of two witnesses.

LUDWIG HAGEN.

Witnesses:
   A. DEMELIUS,
   B. ROI.